W. E. MARTIN.
SIDE DELIVERY RAKE, SWATH TURNER, &c.
APPLICATION FILED OCT. 29, 1909.
954,534.
Patented Apr. 12, 1910.
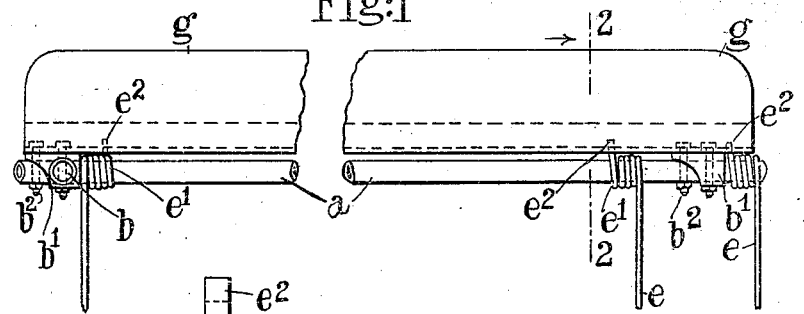
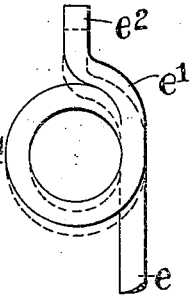
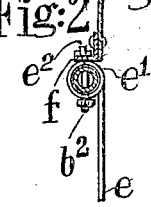
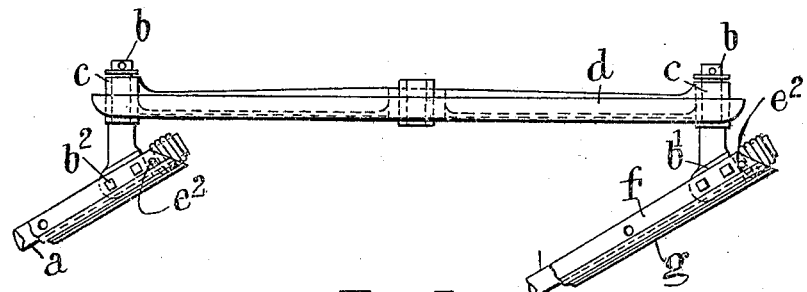
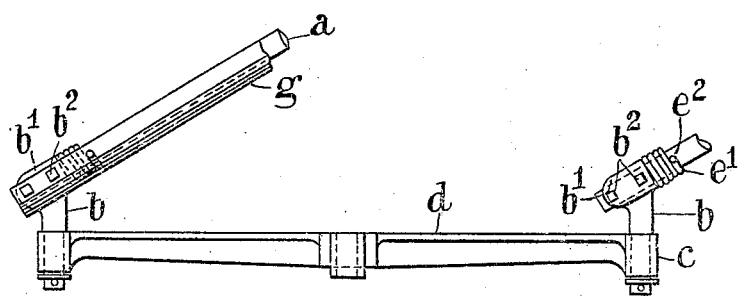
Witnesses
H. W. Knight
Ray J. Ernst
Inventor
William Edward Martin
by Knight Bros
his attorneys

UNITED STATES PATENT OFFICE.

WILLIAM E. MARTIN, OF STAMFORD, ENGLAND.

SIDE-DELIVERY RAKE, SWATH-TURNER, &c.

954,534.  Specification of Letters Patent.  Patented Apr. 12, 1910.

Application filed October 29, 1909. Serial No. 525,362.

*To all whom it may concern:*

Be it known that I, WILLIAM EDWARD MARTIN, a subject of the King of Great Britain, residing at Stamford, in the county of Lincoln, England, have invented new and useful Improvements in Side-Delivery Rakes, Swath-Turners, and the Like, of which the following is a specification.

The object of the present invention is to improve the construction and to facilitate the manufacture of side delivery rakes, swath turners and the like of the type shown and described in the specifications of Letters Patent granted to me Nos. 800,662; 818,899 and 871,604.

The invention is illustrated in the accompanying drawings, in which—

Figure 1 is a front elevation of a rake head, and Fig. 2 is a section on the line 2—2 of Fig. 1 looking in the direction of the arrow. Fig. 3 is a plan of a complete rotating rake but omitting the driving and carrying means. Fig. 4 is a side elevation of the upper part of my improved tine.

According to the present invention I form the rake heads in three pieces. The main portion is formed of a tube or rod $a$. The two parallel end portions $b$, which are carried in the bearings $c$ in the ends of rotating radial arms or disks $d$, as described in aforesaid specifications, are each formed with a tubular portion or socket $b'$ set at the desired angle. These tubular portions are placed in position on each end of the tube or rod $a$ and are there fixed in any suitable manner but preferably by bolts $b^2$ which pass through holes in the tubular portions $b'$ and in the rake heads $a$. One of these end portions $b$, $b'$, is placed a short distance from the end of the tube or rod $a$ forming the rake head, to enable one or more tines $e$ to be fixed at the extreme end of the rake and outside the carrying pin $b$. The tubular portion $b'$ is preferably flat at its top to form a seating for the angle iron bar $f$ described in aforesaid specification No. 871,604, to which the concave shield $g$, also described in said specification, is fixed.

The spring tines $e$ have coils at their upper end which surround the rake head, and the end convolution $e'$ of each coil, that is to say, the one farthest from the tine, is formed eccentric to the other convolutions and stands up above them, as seen in Fig. 4. This last convolution $e'$ terminates with a vertical straight end $e^2$ which enters a hole in the before mentioned angle iron bar $f$ situated above the rake head $a$. This angle bar $f$ is bolted down on to the flat upper surface of the tubular portions $b'$, and as it approaches the latter, it gradually moves the eccentric convolution $e'$ downward and finally fixes the tine $e$ without fixing the remaining convolutions of the coils. Consequently the tines remain in a more yielding condition than in the previous forms of these machines.

It will be understood that the parallel portions $b$, instead of being solid in the form of pins, may be in the form of bearings which fit over pins carried by the rotating radial arms or disks $d$. These end portions $b$, $b'$, may be readily renewed when they become worn or injured.

What I claim is:—

1. In a rake, the combination of a main portion of the rake head carrying tines and separably constructed end portions fixed to the main portion and parallel to each other by which the complete rake head is carried, substantially as set forth.

2. In a rake, the combination of a main portion of the rake head carrying tines, parallel end portions, a tubular part on each end portion fitting the main portion, a flat upper surface on each end portion, and an angle bar fixed to said flat upper surface, substantially as set forth.

3. In a rake, the combination of a main portion of the rake head carrying tines, parallel end portions, one end portion being located at a short distance from the end of the main portion, a tine fixed on the main portion, outside the last mentioned end portion, a tubular part on each end portion fitting the main portion, a flat upper surface on each end portion, and an angle bar fixed to said flat upper surface, substantially as set forth.

4. In a rake, the combination of a main portion of the rake head, tines carried by said main portion, coils formed on said tines surrounding the main portion, one of which is formed eccentric to the other coils, parallel end portions, a flat upper surface on each end portion, and an angle bar fixed to said flat upper surface and bearing on the eccentric coils, substantially as set forth.

In witness whereof I have hereunto set my hand in presence of two witnesses.

W. E. MARTIN.

Witnesses:
CLAUDE K. MILLS,
WM. GIRLING.